United States Patent [19]

Birch

[11] Patent Number: 4,988,834
[45] Date of Patent: Jan. 29, 1991

[54] CABLE SEALING SYSTEM
[75] Inventor: Laurie L. Birch, Newfoundland, N.J.
[73] Assignee: AT&T Bell Laboratories, Murray Hill, N.J.
[21] Appl. No.: 399,659
[22] Filed: Aug. 28, 1989
[51] Int. Cl.⁵ .......................................... H02G 15/013
[52] U.S. Cl. .................... 174/93; 174/77 R; 174/92
[58] Field of Search .................. 174/92, 93, 97 R; 277/DIG. 10

[56] References Cited

U.S. PATENT DOCUMENTS

| | | | |
|---|---|---|---|
| 2,771,502 | 11/1956 | King et al. | 174/92 |
| 3,796,823 | 3/1974 | Wright et al. | 174/92 |
| 3,836,696 | 9/1974 | Gressitt et al. | 174/59 X |
| 4,262,168 | 4/1989 | Bossard | 174/77 R |
| 4,267,401 | 5/1981 | Wilkinson | 174/77 R |
| 4,387,268 | 6/1983 | Morel | 174/92 |
| 4,492,816 | 1/1985 | Morel et al. | 174/77 R X |
| 4,704,499 | 11/1987 | Faust | 174/92 |
| 4,724,278 | 2/1988 | Smith | 174/77 R X |
| 4,822,954 | 4/1989 | Rebers et al. | 174/77 R X |
| 4,857,672 | 8/1989 | Rebers et al. | 174/77 R X |

FOREIGN PATENT DOCUMENTS 1440082  2/1969  Fed. Rep. of Germany ........ 174/92

Primary Examiner—Morris H. Nimmo
Attorney, Agent, or Firm—L. H. Birnbaum

[57] ABSTRACT

Disclosed is a cable seal for use primarily in aerial closures and terminals. The seal includes a pair of compliant elements with their major surfaces in contact. Each element includes a series of rings attached by a thin web of material so that rings can be removed to accommodate different cable sizes. A slit extends radially from the center ring to permit installation of the elements over the cable. The slits of the two elements are arranged out of alignment to ensure that no gaps in the seal exist at the slits.

7 Claims, 3 Drawing Sheets

CABLE SEALING SYSTEM

BACKGROUND OF THE INVENTION

This invention relates to sealing of cables, for example, at the points of entering and exiting an aerial closure or terminal.

Telephone lines strung across poles require aerial closures and terminals at frequent intervals. A closure is a housing used to protect a splice in the cable, while a terminal is a housing which not only protects a cable splice, but also includes termination points so that a wire pair can extend from the main cable to the customer's premises. A typical closure or terminal includes a cable adapter, also known as a boot, where the cable enters and exits the housing. The boot is made from a hard material in two halves which are fastened with an eyehook around the cable. The surface of the boot through which the cable passes includes a series of perforations which can be removed to adjust the size of the opening in the boot to fit the cable. A compliant material is also installed adjacent to this surface of the boot and includes a similar series of rings which can be removed to conform to the size of the cable. ( See U.S. Pat. No. 4,704,499 issued to Faust, which is incorporated by reference herein.)

The combination of the housing, boot and compliant material provides effective protection for the splices and terminations within the aerial closures and terminals. Specifically, the hard material of the boot prevents entrance of rodents into the housing, and the compliant material seals the housing from water and other outside contaminants. However, there is a problem with this design since the compliant material requires a radial slit through each perforation to permit installation of the material around the cable. This slit may fail to close completely if the hole formed by the removal of the rings in the material is slightly smaller than the diameter of the cable. Conversely, if the hole is made too large in order to ensure closing the slit, a circular gap between the cable and material can result.

It is, therefore, an object of the invention to provide a housing including a sealing system for sealing the contents of the housing from outside contaminants.

SUMMARY OF THE INVENTION

This and other objects are achieved in accordance with the invention which is apparatus for enclosing a cable. Ths apparatus comprises a housing including at least one end surface adapted for permitting passage of a cable therethrough. The apparatus further includes compliant means adjacent to the end surface. The compliant means comprises a pair of compliant elements with major surfaces in intimate contact. Each element includes at least one removable ring for forming a variable hole diameter in the surface, and a radial slit extending through the ring to an edge of each surface. The slits of the two elements are sufficiently out of alignment to prevent any significant penetration of contaminants through the surfaces.

BRIEF DESCRIPTION OF THE DRAWING

These and other features of the invention are delineated in detail in the following description. In the drawing.

It will be appreciated that, for purposes of illustration, these figures are not necessarily drawn to scale.

DETAILED DESCRIPTION

Figure 1:
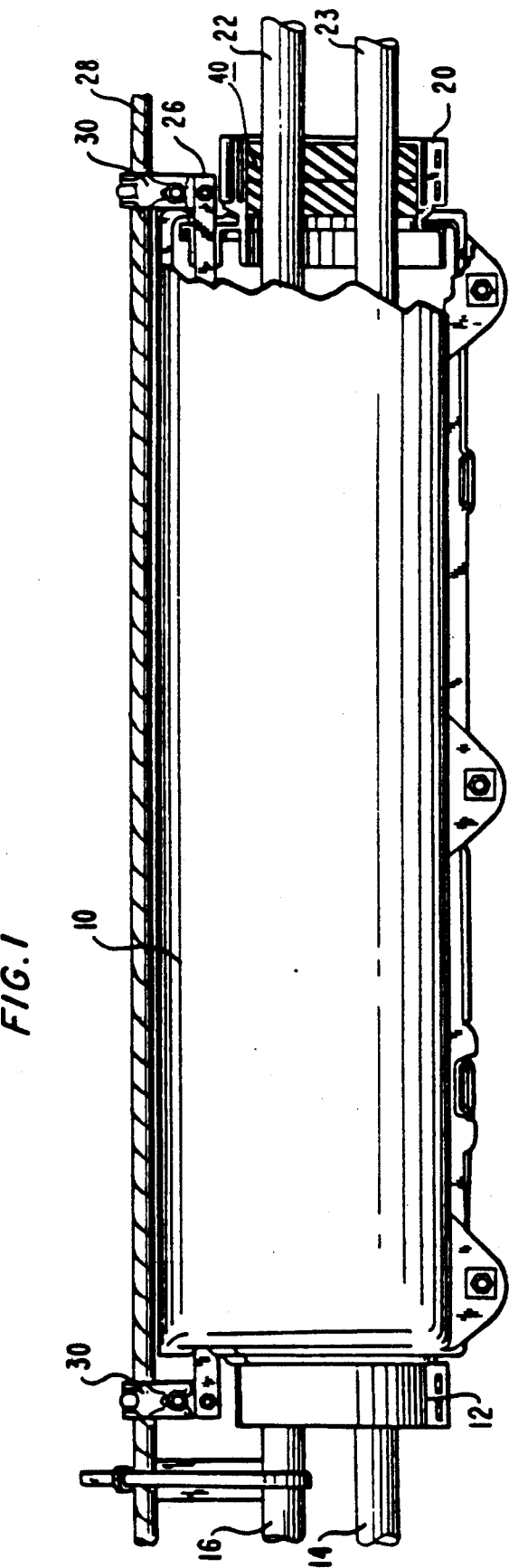
FIG. 1 is a side view, partly cut away, of an aerial closure including features of the invention in accordance with one embodiment.

FIG. 1 is a side view, partly cut away, of a typical aerial closure incorporating the invention. The closure includes an essentially cylindrical housing (10) surrounding splices (not shown) between a pair of incoming cables (14 and 16) and outgoing cables (22 and 23). Provided at the two ends of the housing are cable adapters, or boots (12 and 20), which allow the cables to pass through the housing. The housing (10) is secured to ridges in the boot in a manner such as that shown in U.S. Pat. No. 3,836,696 issued to Gressitt, et al, which is incorporated by reference herein. The closure is secured to cable strand (28) by means of a strand adapter (30) coupled to a grounding bar (26) running the length of the housing (see, e.g., U.S. Pat. No. 4,032,212 issued to Faust, et al). The space between the cables (e.g., 22 and 23) and boot (e.g., 20) is filled by a compliant member (40) which is described in more detail below. The housing (10) and boots (12 and 20) are typically made of polypropylene and the compliant member is typically made of a foam or rubber-like material such as a closed cell foam.

It will be appreciated that although the invention is illustrated for enclosing two cables at a surface, it can function with one or any number of cables.

Figure 2:
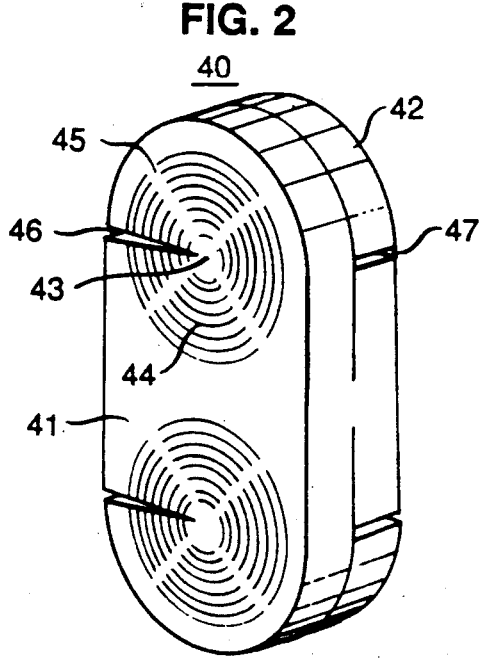
FIG. 2 is a perspective view illustrating a compliant element prior to installation in accordance with an embodiment of the invention.

FIG. 2 illustrates a sealing member (40) in accordance with the invention prior to incorporation into the aerial closure shown in FIG. 1. The member includes a pair of compliant elements (41 and 42) which in this example have essentially the same shape and dimensions. (However, the two elements need not be the same size or shape nor need they be the same material.) A major surface of each element is in intimate contact with another major surface of the other element. In this example, the surfaces are held together by an adhesive. Each element includes a series of perforations through the major surfaces in the areas where the cables will pass through the material. The perforations form a central core (e.g., 43) surrounded by a series of rings (e.g., 44) held together by webs (e.g. 45) of the material of the elements. A radial slit (e.g., 46) extends from the central core (e.g., 43) to an edge of the element. (The openings in the slits are greatly exaggerated for the purpose of illustration.) The element (42) includes a similar pattern of perforations as shown for element (41), and the central core and rings of the two elements are aligned to ultimately permit passage of the cable through both elements.

An important difference in the perforated patterns of elements 41 and 42 is that the slits (e.g,, 46 and 47) are purposely non-aligned. In this example, the slits of the two elements are oriented at approximately 180 degrees. However, any non-aligned orientation should be acceptable, provided that the orientation angle is at least in excess of the anticipated gap in the slits when the seal is installed in the cable.

Figure 3:
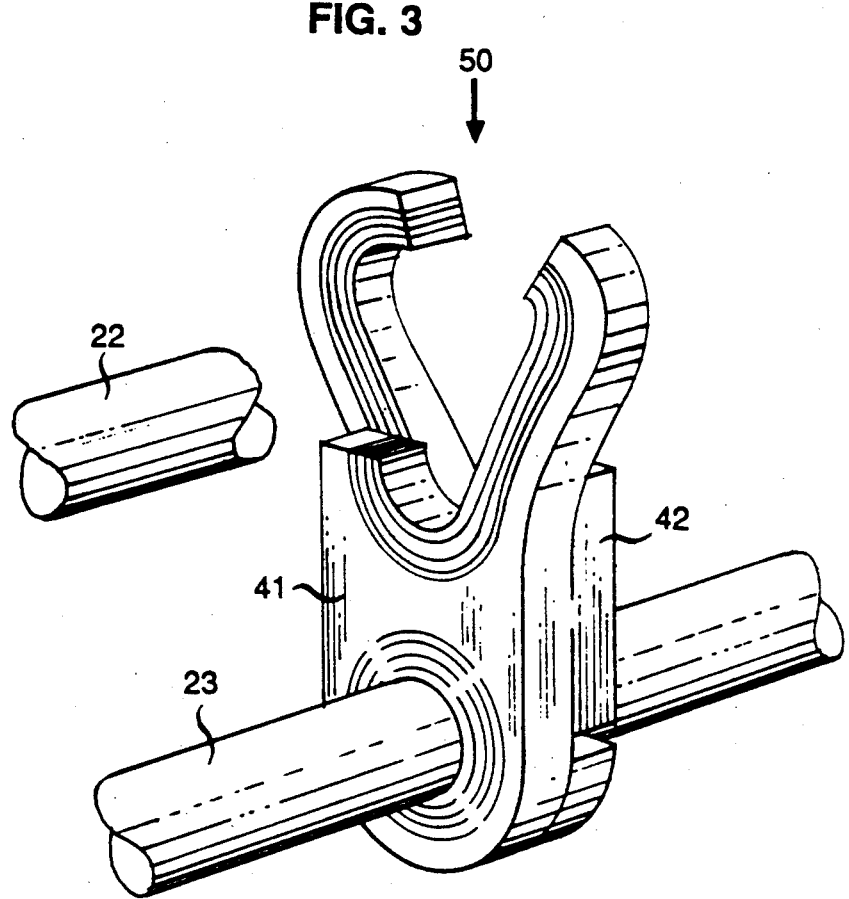
FIG. 3 is a perspective view showing insertion of the element of FIG. 2 over a pair of cables.

In order to install the sealing member on the cables, the central cores (e.g., 43) of the two elements (41 and 42) are removed along with a number of the rings (e.g., 44) depending upon the size of the cable. Preferably, the diameter of the resulting hole formed through the two elements is slightly less than the diameter of the cable for reasons discussed below. As illustrated in FIG. 3, the member is fitted over the cables (e.g., 22) by bending each element (41 and 42) backwards from the area of the slits (46 and 47) until an opening (50) is created sufficient to slip the member over the cable (22). (The same operation was performed for fitting the bottom portion of the member over cable 23.) The compliancy of the member will permit such bending without damaging the member and will also result in the member returning to its original shape.

Figure 4:
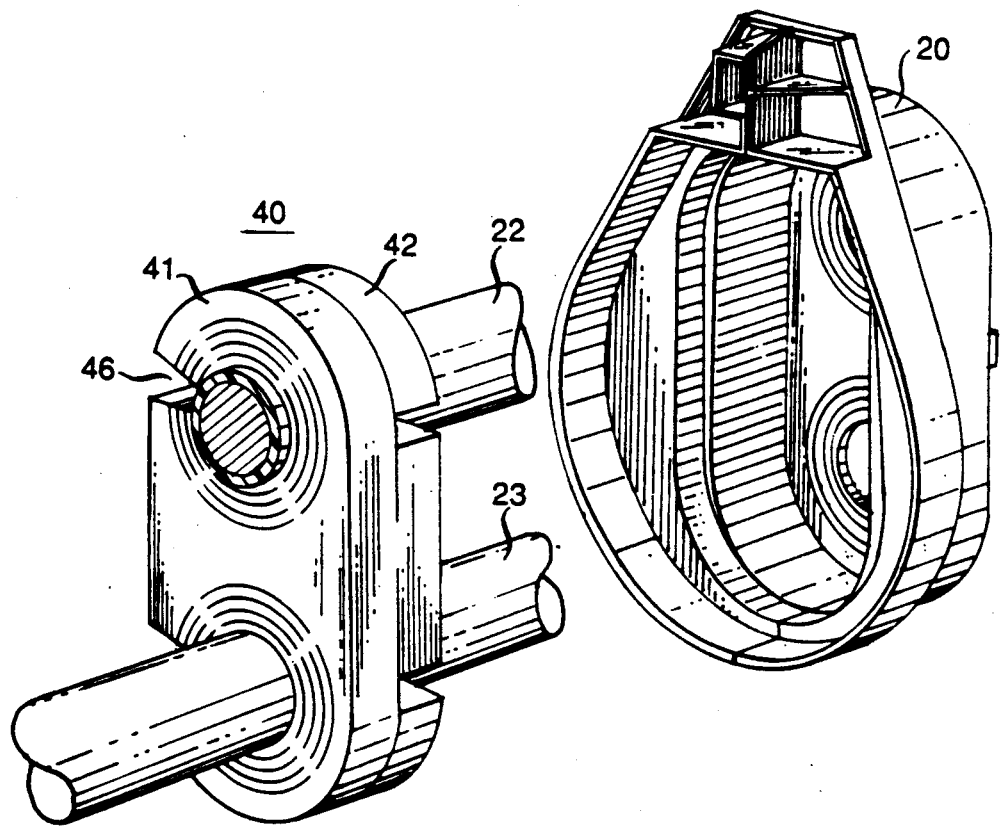
FIG. 4 is an exploded perspective view of the compliant element of FIG. 2 after installation and in combination with a boot.

FIG. 4 illustrates the member installed on the cables (22 and 23). It will be noted that the slits now form a gap in each element due to the fact that the hole in each element is slightly smaller than the cable diameter. However, an effective circumferential seal is formed since the slits of the two elements (41 and 42) are out of alignment and, therefore, the gap in one element is sealed by the adjacent element. When the sealing member (40) is pressed within the cavity of the boot (20) substantial compressive sealing forces will be provided around the circumference of the cable whether the cable has a uniform or irregular cross-section. Also, since the material of the sealing member does not bond to the cable sheath, the cable is free to move axially in cases of ice loads and high winds.

Although the sealing member in this example was a foam material, it will be appreciated that other pliable, compressive materials, such as rubber, silicone or urethane, can be utilized. The sealing membe could also be a single unit with front and back sections which operate as previously described.

Various additional modifications will become apparent to those skilled in the art. All such variations which basically rely on the teachings through which the invention has advanced the art are properly considered within the scope of the invention.

I claim:

1. Apparatus for enclosing a cable comprising:

a housing including at least one surface adapted to permit a cable to pass therethrough; and compliant means adjacent to at least one end surface, said means comprising a compliant member with integral front and back sections having substantially flat major surfaces in intimate contact prior to installation over a cable, each section including at least one removable ring in said major surfaces and at least one radial slit extending through said ring to an edge of each major surface, the slits of the two sections being sufficiently out of alignment to prevent any significant penetration of contaminants through said major surfaces, and the member being installable on a cable by opening both slits sufficiently to permit a cable to pass through the resulting opening formed in both sections of the member.

2. Apparatus according to claim 1 wherein the slits are approximately 180 degrees out of alignment.

3. Apparatus according to claim 1 wherein the sealing member comprises a material selected from the group consisting of a foam, silicone, rubber, and urethane.

4. Apparatus according to claim 1 wherein a hole is formed in the said major surfaces and the hole is less than the diameter of the cable so that a gap is formed by each slit.

5. A device for sealing cables comprising a compliant member with integral front and back sections having substantially major surfaces in intimate contact prior to installing over a cable, each section including at least one removable ring for forming a variable hole diameter in said surfaces and at least one radial slit extending through said ring to an edge of each surface, the slits of the two sections being sufficiently out of alignment to prevent any significant penetration of contaminants through said surfaces when said device is installed on a cable in combination with a housing adjacent thereto, and the member being installable on a cable by opening both slits sufficiently to permit the cable to pass through the resulting opening formed in both sections of the member.

6. The device according to claim 5 wherein the slits are approximately 180 degrees out of alignment.

7. The device according to claim 5 wherein the compliant member comprises a material selected from the group consisting of foam, silicone, rubber, and urethane.

* * * * *